F. G. & W. F. NIEDRINGHAUS
MODE OF ATTACHING HANDLES.
No. 189,378.  Patented April 10, 1877.
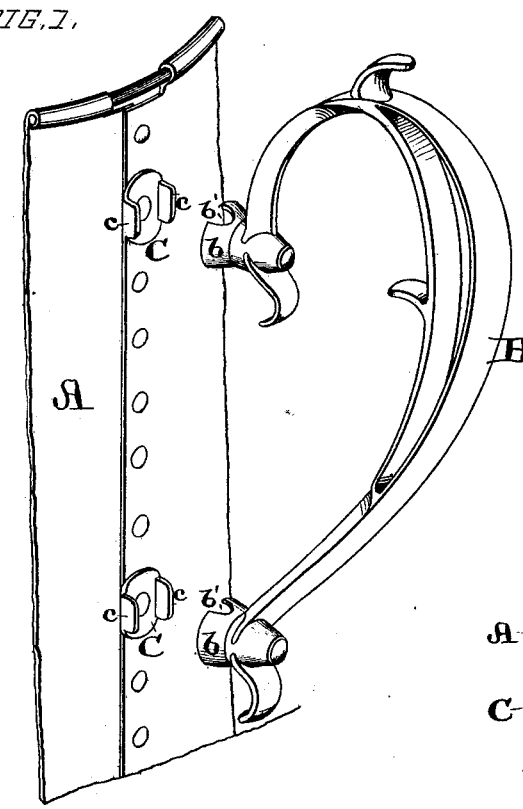
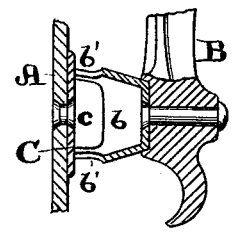
ATTEST:
Saml. S. Boyd
Paul Bakewell
INVENTORS
Frederick G. Niedringhaus
William F. Niedringhaus
By Chas. D. Moody,
their atty.

UNITED STATES PATENT OFFICE.

FREDERICK G. NIEDRINGHAUS AND WILLIAM F. NIEDRINGHAUS, OF ST. LOUIS, MISSOURI.

IMPROVEMENT IN THE MODE OF ATTACHING HANDLES.

Specification forming part of Letters Patent No. 189,378, dated April 10, 1877; application filed February 16, 1877.

*To all whom it may concern:*

Be it known that we, FREDERICK G. NIEDRINGHAUS and WILLIAM F. NIEDRINGHAUS, of St. Louis, Missouri, have made a new and useful Improvement in the Mode of Attaching Handles, of which the following is a full, clear, and exact description, reference being had to the annexed drawing, making part of this specification, in which—

Figure 1 is a perspective, showing a portion of a vessel embodying our invention, the handle being detached; and Fig. 2, a detail in section, showing the handle as attached.

Similar letters denote same parts.

The present invention relates to a mode of attaching handles to vessels. It is adaptable to several varieties of vessels, but is intended to be used more especially in connection with a sheet-metal vessel, the body of which is coated with an enamel, and whose handle is attached by soldering.

Referring to the annexed drawing, A represents the body of a vessel that may be of any preferable shape. The body is coated with an enamel. B represents the handle to be attached. It may be of any desirable form and material, saving at the points $b\ b$, where it is attached to the body, and which are of a substance like tin, that solder will adhere to. C C represent ears, that are attached—preferably by riveting—to the body A, and at suitable points to receive the handle. They are composed of a material to which solder will adhere, and preferably of a material—such as tin or brass—that does not readily receive an enamel, and in form are of such a shape as to project from the body A and enter into the points $b\ b$ of the handle, which are cup-shaped to fit down over the projections $c\ c$ of the ears, and preferably to abut against the body A, as shown in Fig. 2.

The projections $c\ c$ of the ears may be of any desirable shape, as well as the cup-shaped points $b\ b$ of the handle, provided the one part is made to pass into the other—that is, the projections into the cups, or the cups into the projections.

The handle is attached in position by passing the cups $b\ b$ over the ears C C, as in Fig. 2, and then soldering these parts together. There are openings $b'\ b'$ in the points $b\ b$, to admit the solder, and the parts are, preferably, so shaped as to leave a space between the side of the projection $c$ and the cup $b$, to receive the solder.

In this manner the handle can be neatly and strongly attached to the vessel. The handle may be of the kind shown, which is now an article of commerce; and the body of the vessel may be covered with an enamel.

We are aware that a handle has been attached to a glazed vessel by soldering it directly to a portion of the wall of the vessel not covered by the glaze; but our present aim is to provide a more durable as well as neater form of attachment, and we disclaim the construction referred to.

We claim—

1. The body A, projecting ears C C, and handle B, having the sockets $b\ b$, constructed and combined substantially as described.

2. In a sheet-metal or other vessel, the combination of an enameled body, A, a projecting ear or ears, C C, formed of a metal to which enamel does not adhere, and a handle, B, substantially as described.

3. The ears C C, having the projections $c\ c$, and the handle B, having the cup-points $b\ b$, arranged and united by soldering, substantially as described.

F. G. NIEDRINGHAUS.
WM. F. NIEDRINGHAUS.

Witnesses:
CHAS. D. MOODY,
SAML. S. BOYD.